F. M. PEARL.
Cane-Stripper.
No. 42,019
Patented Mar. 22, 1864.
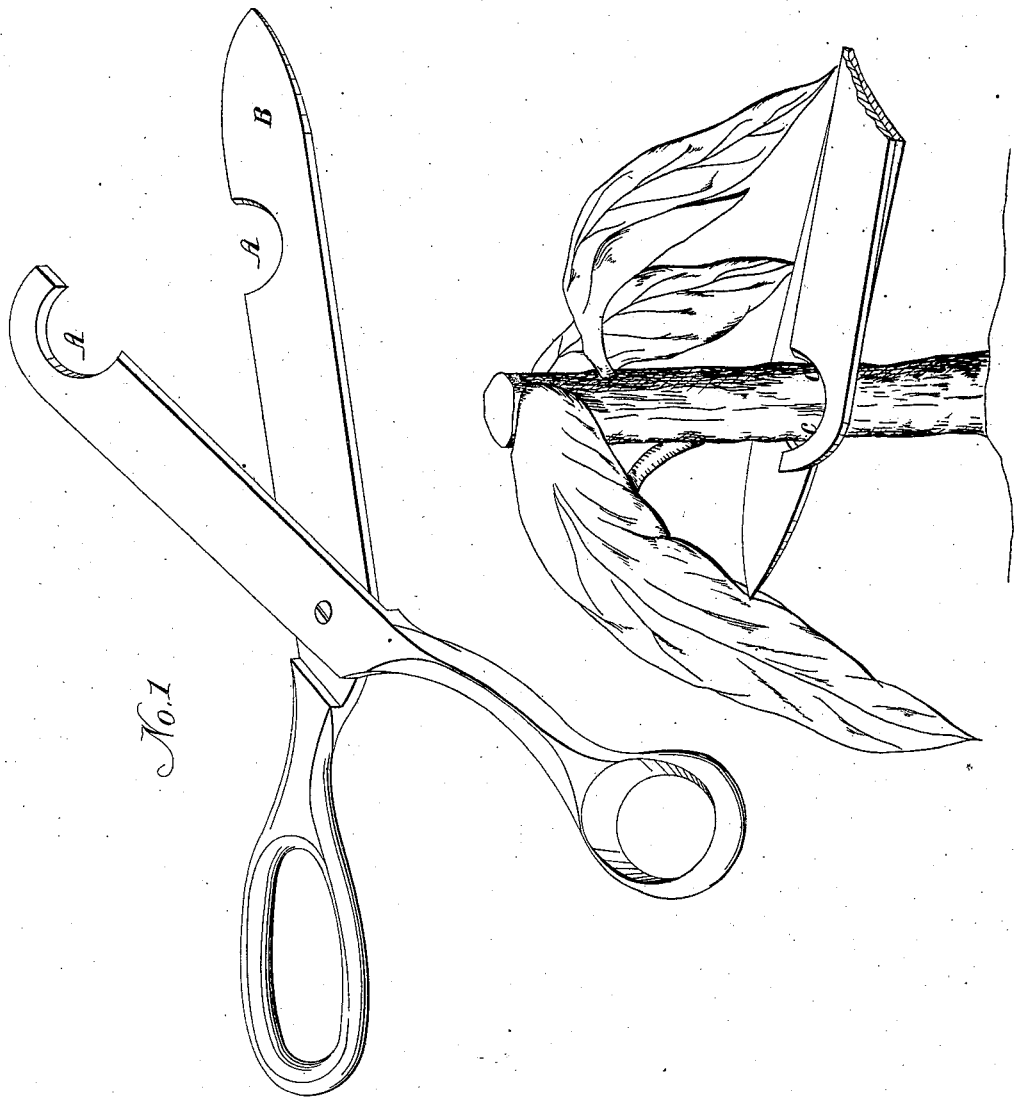
Witnesses
Jno. D. Ditton
A. Moore
Inventor
F. M. Pearl
By his atty
Geo. H. Paman

UNITED STATES PATENT OFFICE.

F. M. PEARL, OF NEAR OWENSBOROUGH, KENTUCKY.

IMPROVED MODE OF SECURING A DESIRABLE COLOR TO TOBACCO.

Specification forming part of Letters Patent No. 42,019, dated March 22, 1864.

*To all whom it may concern:*

Be it known that I, F. M. PEARL, of near Owensborough, of the county of Daviess, State of Kentucky, have invented a new and Improved Mode of Yellowing or Securing a Desirable Color in Tobacco by deadening the plant as it stands in the field before cutting the same, which will at all times secure a good color without the risk of sunburn, as is the case when scaffolded out to yellow and deaden the sap, or damage by house-burn in the house, as is the danger when cut green and full of sap and placed immediately in the house to become yellow and cure up.

By the process of deadening the plant in the field and permitting it to stand until sufficiently yellowed to be cured the color desired many advantages to the planter are secured, such as lessening the risks of damages of various kinds, saving of labor, and also the lessening of house-room, as much more can be placed safely in the house than when green and cure up much sooner than when housed full of sap, as is the case in its natural state.

Labor is saved from the time of cutting until housed, as while standing in the field to yellow, after being deadened, the flow of sap being stopped or greatly checked, the plant is much lighter to handle, and instead of setting the plant on the ground, after cutting, with the under and tender sides of the leaves exposed to the sun to wilt, which invariably becomes more or less damaged by sunburn in hot weather before wilting sufficiently to handle without becoming bruised and great loss by breaking off of leaves, all of which is avoided by deadening, as it may stand exposed to the sun and weather, even if it should be rainy, bad weather, a considerable length of time in its natural position—upper side of the leaves being exposed—without injury, and may be cut, placed on the sticks as cut without being put to the ground, taken immediately to the house, and placed as desired to remain and cure without any further exposure to the sun, as it becomes sufficiently wilted and toughened before cutting to be safely and expeditiously handled without bruising or the breaking of leaves, as in the usual way of cutting and hauling to house or scaffold. By this process scaffolding is entirely dispensed with, a vast amount of labor saved, and greatly facilitates the curing after it is housed, as it can be fired immediately, if desired to be cured by the process of fire, or, if preferred to cure by the atmosphere, it may be placed thicker or closer in the house by one-fourth without danger of house-burn, thus saving one-fourth less house-room than when housed green, all of which is of vast importance to the planter, the securing at all times a desirable color, less risk of damages of various kinds, less labor, and less house-room, and speedy cure for early market; and from my experiments increased weight, improved color, and superior quality are secured by the deadening process.

Another great advantage of this invention is that when tobacco is fully ripe and is losing in weight or injuring in quality for want of cutting, or if attacked by spot or other disease, as is sometimes the case, and will greatly injure in a few days if not cut, in either case, if prevented by want of house-room to secure it, foul weather, or any cause or causes that may prevent the cutting at this critical time, the loss of weight, injury of quality, or deterioration of any kind, can be as effectually checked by deadening and permitted to stand in the field until sufficiently yellowed to be cured the color desired as if cut and housed, thus giving the planter the important advantage of delaying the cutting of tobacco at his leisure, and making it at this important critical and pressing period subservient to his will—an advantage long desired. The opinion and practice of planters heretofore have been that tobacco must be cut when ripe immediately or great loss must naturally accrue each day or hour it may be delayed, all of which may be remedied by this process and be permitted to remain standing with decided improvement to color, quality, and weight to the tobacco, and great labor saving, profit, and convenience to the planter, as set forth above.

To enable others to make and use my invention, I will describe the operation.

The tobacco-shears, as shown in drawing No. 1, opening on a rivet near the center, rather shorter back of the rivet, with bows at back end for hand and thumb. The part forward of the rivet is flat bars, longer than back part, with square or blunt edges, not intended to cut, with a half-circle in bar or blade, as at letters A A, with bevel edges for cutting, the circle being intended to encircle the stalk of tobacco as it stands and make a cut or belt around the stalk. One blade is longer than the other and pointed (marked B) for sticking or piercing the stalk in or near the cut or belt, as shown on drawing No. 2 at letters C C, which drawing is intended to represent a plant of tobacco some days after being deadened and partially yellowed. To deaden the tobacco take the shears by the bows, embrace the stalk of tobacco below the leaves desired to be saved, as C C on drawing No. 2, with the circles marked A A on shears. Then press lightly, as it is not intended to cut very deep. Then carry the hand one-fourth around the plant. Then reverse the motion, carrying the hand one-fourth around the other way from the point started from first, and the belt is completed. Then pierce the stalk in or near the cut or belt, as at C C, with the point marked B. The piercing is not necessary only when it is wished to hasten the wilting and yellowing. If it is desired to protract the cutting, best not to pierce it. If desired to hasten the yellowing, it may be pierced one or more times, as desired.

The shears to be of metal or wood.

I do not claim to be the inventor of the entire construction of the tobacco-shears so far as they represent shears now in use for other purposes; but

What I claim as my invention, and desire to secure by Letters Patent, is—

The adaptation of the instrument to the deadening of tobacco, in the parts marked A A and B, and the deadening of tobacco in the field, as hereinbefore described, by belting or cutting around the stalk and piercing the stalk in or near the belt or cut to secure a desirable color, lessen labor, &c.

F. M. PEARL.

Witnesses:
R. A. BRITTAIN,
J. W. COLMAN.